United States Patent [19]

Rowland

[11] Patent Number: 5,093,964
[45] Date of Patent: Mar. 10, 1992

[54] CLIP FOR HOLDING FLEXIBLE ELEMENTS SUCH AS WIRE, HOSE, ETC.

[75] Inventor: David E. Rowland, San Diego, Calif.

[73] Assignee: Janice L. Rowland, Imperial Beach, Calif.

[21] Appl. No.: 684,315

[22] Filed: Apr. 12, 1991

Related U.S. Application Data

[63] Continuation-in-part of Ser. No. 363,609, Jun. 8, 1989, Pat. No. Des. 323,972, Ser. No. 575,867, Aug. 31, 1990, Pat. No. 5,062,184, Ser. No. 637,213, Jan. 3, 1991, and Ser. No. 375,664, Jul. 3, 1989, which is a continuation-in-part of Ser. No. 176,670, Apr. 1, 1988, abandoned.

[51] Int. Cl.⁵ .............................................. B65D 63/00
[52] U.S. Cl. .................................. 24/16 R; 24/16 PB; 24/17 AP
[58] Field of Search .............. 24/16 R, 16 PB, 17 AP, 24/30.5 P, 30.5 R; 248/74.3, 51

[56] References Cited

U.S. PATENT DOCUMENTS

| | | | |
|---|---|---|---|
| 357,877 | 2/1887 | Taylor | 24/16 R |
| 3,197,830 | 8/1965 | Hoadley | 24/16 PB |
| 3,597,803 | 8/1971 | Van Neil | 24/16 PB |
| 3,630,195 | 12/1971 | Santomieri | 248/74.3 |
| 3,632,071 | 1/1972 | Cameron | |
| 4,182,005 | 1/1980 | Harrington | 24/16 PB |
| 4,510,650 | 4/1985 | Espinoza | 24/16 PB |
| 4,639,977 | 2/1987 | Howard | 24/16 R |
| 4,658,478 | 4/1987 | Paradis | 24/16 PB |
| 4,711,002 | 12/1987 | Kreeger | 24/17 AP |
| 4,752,054 | 6/1988 | Jonsson | 24/16 PB |

FOREIGN PATENT DOCUMENTS

| | | | |
|---|---|---|---|
| 2352192 | 12/1977 | France | 24/16 PB |
| 0381603 | 10/1964 | Switzerland | 24/16 PB |
| 0933747 | 8/1963 | United Kingdom | 24/16 R |
| 1056740 | 1/1967 | United Kingdom | 24/16 PB |

Primary Examiner—Victor N. Sakran
Attorney, Agent, or Firm—William D. Hall

[57] ABSTRACT

A clip is provided for holding an elongated flexible element. A typical elongated flexible element is an electrical power cord. The clip has a body member having two parallel projections. The power cord may be inserted in the slit between the projections. A power cord in the slit is pinched between the projections. The body member has sockets near each of its ends and a beaded cord has enlargements that fit in the sockets, respectively. The beaded cord can be stretched as it encircles a bundle of wire. When the enlargements on the beaded cord are inserted in the sockets the bundle of wire is held in place.

19 Claims, 2 Drawing Sheets

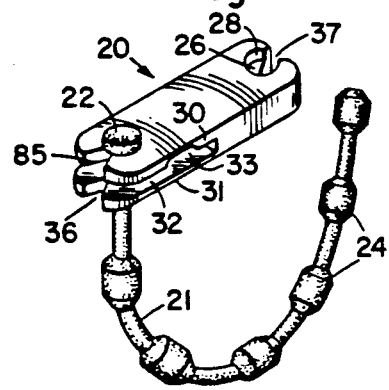
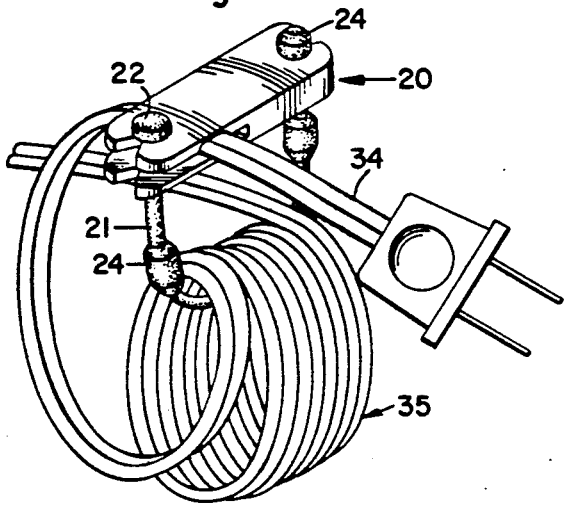
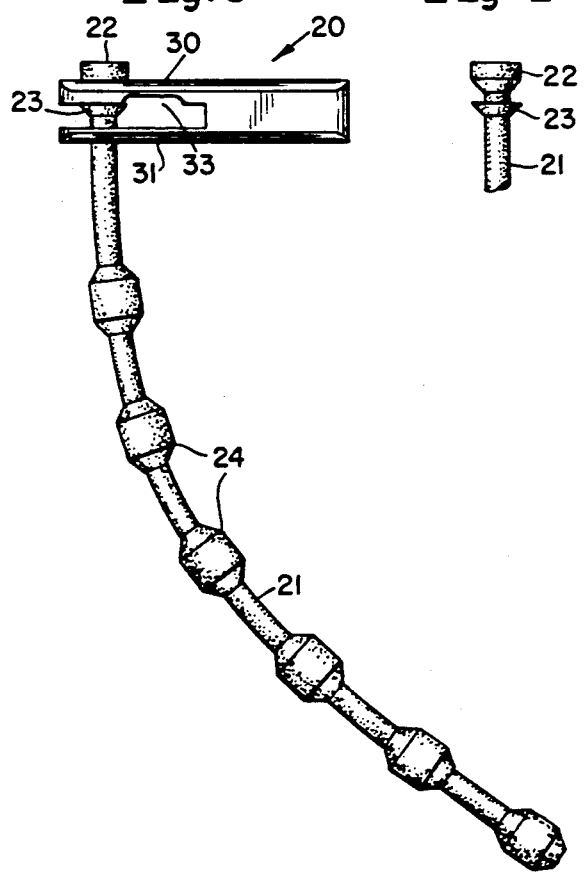
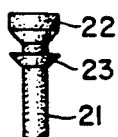
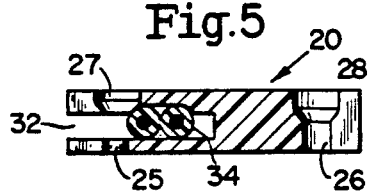
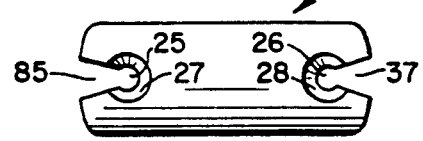
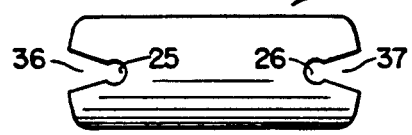
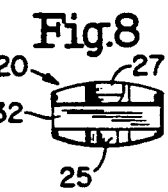
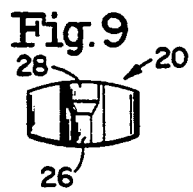

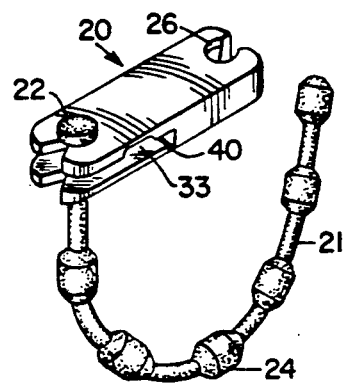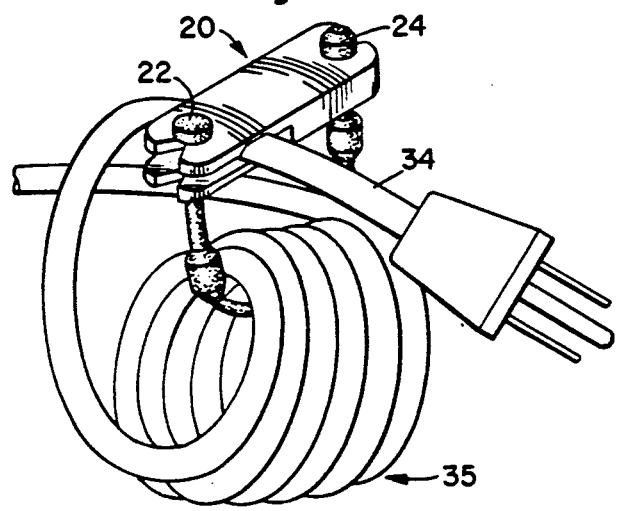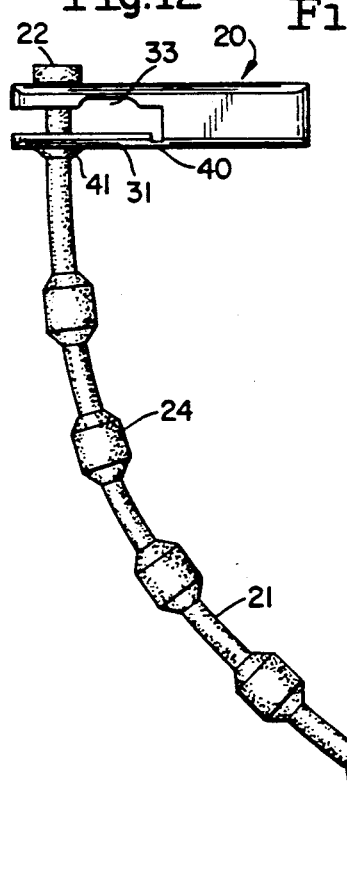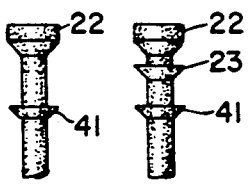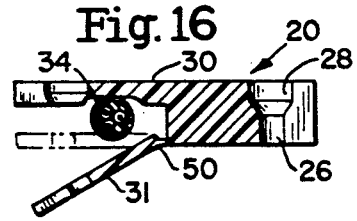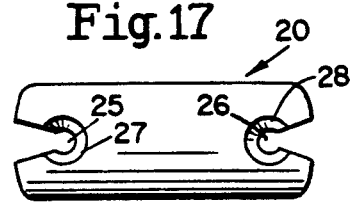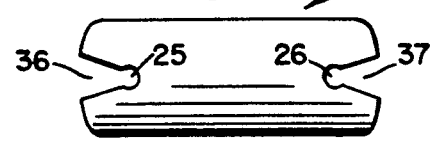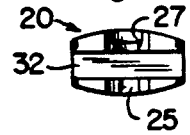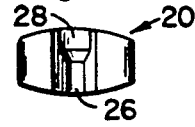

CLIP FOR HOLDING FLEXIBLE ELEMENTS SUCH AS WIRE, HOSE, ETC.

Related Applications

This application is a continuation-in-part of each of the following prior copending application Ser. No. 07/363,609, filed June 8, 1989, entitled Holder for Flexible Elements such as wire, cord, and rubber hose, now, U.S. Pat. No. De. 323,972; Ser. No. 07/375,664, filed July 3, 1989, entitled Flexible Element Holder; and Ser. No. 07/575,867, filed Aug. 31, 1990, entitled Clip for Holding Elongated Devices, now U.S. Pat. No. 5,062,184; Ser. No. 07/637,213, filed Jan. 3, 1991, entitled: Wall Mounted Support for Holding Articles. The aforesaid application Ser. No. 07/375,664 is a continuation-in-part of the earlier application Ser. No. 07/176,670 filed Apr. 1, 1988, entitled Flexible Element Holder, now abandoned.

BACKGROUND OF THE INVENTION

Devices for holding a coil of wire, rubber hose, or the like are well known. Examples of such devices include Jonsson U.S. Pat. No. 4,752,054, United Kingdom patent 1,056,740, published Jan. 25, 1967, and West German patent 2,012,300 dated Sept. 23, 1971.

SUMMARY OF THE INVENTION

This invention provides apparatus for holding and/or supporting an elongated flexible element. The elongated flexible element to be held or supported may be in any form.

Examples include (1) electric cords such as those feeding current to an electric lamp, (2) flexible hoses such as garden hoses and (3) nylon cord such as is used in towing, or in flying a kite, etc. Hereinafter, we will refer to a lamp cord as the example of the elongated flexible element. The lamp cord has a plug at its free end. The apparatus holds a limited portion the lamp cord, adjacent the plug, securely. The remainder of any un-needed length of the lamp cord is then wound into a coil. The elongated flexible member is inserted in the hole in the coil and holds the coil adjacent the body member.

The invention comprises a body member having two projections that are spaced apart from each other to form a slit. The slit may, or may not, have an enlarged portion that fits the outer contour of the elongated flexible element. The elongated flexible element may slide into the slit from the free ends of said projections. Adjacent said free ends there is a hole, through both of said projections, of a size to receive the elongated flexible member. The aforesaid hole may include a tapered socket portion to receive an enlargement on said elongated flexible member. The hole is closer to the free ends of the projections than the enlarged portion of the slit, so that the elongated flexible member passing through said hole holds the elongated flexible element in said slit.

There are further slits in said projections to enable the elongated flexible member to be inserted in said hole.

The elongated flexible member is preferably a beaded cord of a resilient stretchable material. This beaded cord has three enlargements one of which fits in a socket in the upper one of said projections. A second enlargement on the beaded cord fits in the slit between the projections. The third enlargement engages the lower outer surface of the lower one of said projections.

In using the invention a portion of the electric lamp cord, near the plug on that cord, is inserted in the space between said projections and into said enlarged portion of said slit. The beaded cord is then inserted in said hole with one of said enlargements in the socket portion of said hole. The beaded cord is then inserted around a bundle of the electric cord. The beaded cord may be stretched tight and secured to the body member. The tension on the beaded cord applies a pressure on said socket tending to move the upper one of said projections downward thereby causing the projections to pinch the cord. Another way to pinch the cord is to rely on the resilience of the projections to pinch the electric cord.

The beaded cord has beads that fit in sockets located near opposite ends of the body member. The cord is resilient and stretchable so that it can be stretched tight around the lamp cord and so it will apply pressure on one of said projections to pinch the cord.

BRIEF DESCRIPTIONS OF THE DRAWINGS

In the drawings:

FIG. 1 is a perspective view of a clip embodying the invention.

FIG. 2 is a perspective view of the clip of FIG. 1, holding a lamp cord.

FIG. 3 is a side view of the clip of FIG. 1.

FIG. 4 is a side view of an end portion of the beaded cord of FIG. 1.

FIG. 5 is a view, partially in cross-section, of the body member of clip and lamp cord of FIG. 2.

FIG. 6 is a top view of the body member of the clip of FIGS. 1 to 3.

FIG. 7 is a bottom view of the body member of FIG. 6.

FIG. 8 is a left-end view of the body member of FIGS. 1-3.

FIG. 9 is a right-end view of the body member of FIGS. 6 to 8.

FIG. 10 is a perspective view of a modified form of the invention.

FIG. 11 is a perspective view of the modified form of FIG. 10, an electric lamp cord.

FIG. 12 is a side view of the clip of FIGS. 11 and 12.

FIG. 13 is side view of a limited end portion of the beaded cor FIG. 10.

FIG. 14 is a side view of a modified form of the beaded cord of FIGS. 10 to 13.

FIG. 15 is a left-end view of the body member of FIGS. 10, 11, 12, 17 and 18.

FIG. 15a is a right-end view of the body member of FIGS. 10, 11, 12, 17 and 18.

FIG. 16 a side view, partially in section, of a modified form the invention.

FIG. 17 is a top view of the body member of FIGS. 10 to 12.

FIG. 18 a bottom view of the body member of FIGS. 10 to 12 and 17.

DETAILED DESCRIPTION OF THE INVENTION

The clip of FIG. 1 comprises a body member 20 and an elastic, flexible, resilient, stretchable cord 21 having enlargements 22 and 23 near one end, and beads 24 along the length of the cord 21.

The body member 20 is a molded plastic piece having some resilience. This body member 20 has two vertical holes through it, one hole 25 near one end of member 20 and a second hole 26 near the second end of the member 20. Near the upper ends of holes 25 and 26 are sockets 27 and 28. The socket 27 holds enlargement 22 and socket 28 holds any one of beads 24.

The body member 20 has parallel projections 30 and 31 to form a slit 32 which may, or may not, have an enlargement 33. The slit 32 and/or the slit 32 and enlargement 33, form a passageway for the electric cord 34. The slit 32 and enlargement 33 are contoured and sized to fit the cord 34.

The normal resilience of the projections 30 and 31 tends to cause those projections to pinch the electric lamp cord 34 and thus hold it in place once it is inserted in enlargement 33. Another way of causing the projections 30 and 31 to pinch the cord 34 is to pull the cord 21 to press the coil 35 against the body member 20. To do this the enlargement 22 is placed in its socket 27 and then the cord 21 is pulled tight around the coil 35 to draw the coil 35 against the body member 20. The cord 21 is stretched to get good tension in the cord 21 when a bead 24 is inserted in socket 28.

In order to enable the cord 21 to enter the holes 25 and 26, slits 85, 36 and 37 are provided.

The flexible elastic elongated member 21 including enlargement 22 and beads 24, is made as follows: The starting material is Estane TM, a thermoplastic polyurethane produced by B. F. Goodrich Co. This material is fed into the injection mold at 430° F. This temperature is in contrast to the temperature usually employed for injection molding which is 230° to 285° F. The typical diameter of elongated member 21 may be 0.10 inches with the bead diameter 0.3 inches. This is smaller than is customary for injection molding of this type. The material is then subjected to vacuum draw to pull the material into the cavities of the mold. That is to say: the mold is an elongated one and is as long as the elongated member. The Estane material is fed in one end of the mold, and a vacuum is applied to the other end of the mold to make sure that the material fills the entire mold. After the material is molded it is post cured in a heated over for 24 hours at 140° F. The resulting product has excellent memory characteristics, that is after being stretched it returns to its original shape.

FIGS. 10 to 15, 15a, 17 and 18 show a clip identical in every respect to the clip of FIGS. 1 to 9 inclusive except as follows: The body member of FIGS. 10 to 12 has a slot 40 that renders the lower projection 31 more resilient than the projection 31 of FIGS. 1 to 9. This enables the projections 30 and 31 of FIGS. 10-12 to pinch the cord 34 harder than the pinching of FIGS. 1 to 9. In other words, the slit 32 and the enlarged slit 33 of FIGS. 10-12 is made slightly smaller than the corresponding slits 32 and 33 of FIG. 1, and the insertion of the cord 34 in FIGS. 10-12 makes a tighter fit than in the case of FIGS. 1 to 9. The elongated beaded cord 21 of FIG. 12 has an enlargement to press upwardly on projection 31 and tends to cause the projections 30 and 31 to pinch the cord 34.

The modified form of FIG. 16 is identical to the form of FIG. 10-12 except that projection 31 is connected to body member 20 by a hinge 50. The projections 30, 31 of FIG. 16 clamp the wire 34 in place by reason of the enlargement 22 pressing down on projection 30 and enlargement 41 pressing upward on projection 31. The enlargements 22 and 41 (FIG. 14) are spaced apart the proper distance to effect this result.

I claim to have invented:

1. Apparatus for holding an elongated flexible element, comprising:
    a body member having an end and also having a cross-section larger than the cross-section of said elongated flexible element,
    said body member defining a slit, extending from said end into the interior of said body member, for receiving a portion of said elongated flexible element and allowing said elongated flexible element to be inserted into the interior of said body member,
    an elongated flexible member having two spaced-apart portions connected to said body member, at least one of which portions is connected to said body member by a removable connection,
    said removable connection comprising means for blocking the slit to prevent removal of said elongated flexible element through said slit,
    said elongated flexible member comprising means for holding a plurality of loops of said elongated flexible element.

2. Apparatus as defined in claim 1 in which said body member has a top side, a bottom side, and a sidewall,
    said sidewall having said end and an outer surface,
    said slit extending from said outer surface into the interior of said body member.

3. Apparatus as defined in claim 2, in which said body member comprises means for pinching an elongated flexible element inserted therein.

4. Apparatus as defined in claim 3, in which said body member is composed of resilient material so that the size of said slit may be varied.

5. Apparatus as defined in claim 4, in which said elongated flexible member comprises means connected to said body member for biasing said body member to tend to close said slit.

6. Apparatus as defined in claim 5 in which one end of said elongated flexible member is connected to said body member adjacent said outer surface for applying a force to said body member that tends to bias said body member so as to tend to close said slit and thereby tend to pinch any portion of said elongated flexible member that is in said slit.

7. Apparatus for holding an elongated flexible element, comprising:
    a body member having two spaced-apart ends, one of these ends having an outer surface,
    said body member defining a slit extending from said outer surface and ending in the interior of said body member,
    an elongated flexible member extending from a first location adjacent to one of said ends to a second location adjacent to the other of said ends,
    said body member defining a hole therethrough, at said first location, which hole extends through said slit adjacent to said outer surface,
    said slit extending into said body member a sufficient distance to permit a portion of said elongated flexible element to be positioned in said slit between said hole and the end of said slit,
    said elongated flexible member extending through said hole.

8. Apparatus as defined in claim 7 in which said body member defines a first socket, as a part of said hole, which acts as a socket for holding said elongated flexible member in said hole.

9. Apparatus as defined in claim 8 in which at least a portion of said body member adjacent said hole is resilient so that said elongated flexible member may bias said body member and pinch any portion of the elongated flexible element that is in said slit.

10. Apparatus as defined in claim 9, comprising:
said elongated flexible member having a first enlargement that fits in said socket.

11. Apparatus as defined in claim 10, comprising:
said elongated flexible member having a second enlargement,
said body member having a socket at said second location, for receiving said second enlargement.

12. Apparatus as defined in claim 11, comprising:
said elongated flexible member having a third enlargement,
said body member having a top side, a bottom side and said outer surface,
said first socket constituting a depression in said top side,
said third enlargement engaging said bottom side.

13. Apparatus as defined in claim 11, comprising:
said elongated flexible member having said second enlargement that engages said body member and cooperates with said first enlargement to form means that pinches said body member and tends to close said slit.

14. Apparatus for supporting an elongated flexible element, comprising:
a body member having first and second projections that are spaced apart from each other to form a slit for receiving a portion of said elongated flexible element, and
an elongated flexible member having two ends connected to said body member, one of these connections constituting a removable connection,
said elongated flexible member comprising means for supporting said elongated flexible element,
one of said connections comprising means for holding said elongated flexible element in said slit.

15. Apparatus as defined in claim 14, in which said body member defines a hole, through said projections, for receiving said elongated flexible element.

16. Apparatus as defined in claim 15, in which at least one of said projections is resilient and tends to pinch an elongated flexible element that is in said slit.

17. Apparatus as defined in claim 16, comprising:
said elongated flexible member having an enlargement for engaging one of said projections when said elongated flexible element is passing through said hole,
each of said projections defining a slit to enable said elongated flexible member to be inserted into said hole.

18. Apparatus as defined in claim 17, in which said elongated flexible member and said projections comprise means for pinching said portion of said elongated flexible element when said elongated flexible member tightly holds said elongated flexible element.

19. Apparatus as defined in claim 17, comprising another enlargement on said elongated flexible member, each of said projections having an outer surface, said enlargements respectively engaging outer surfaces of said projections respectively.

* * * * *